United States Patent
Cheng et al.

(10) Patent No.: US 11,367,196 B2
(45) Date of Patent: Jun. 21, 2022

(54) IMAGE PROCESSING METHOD, APPARATUS, AND STORAGE MEDIUM

(71) Applicant: TENCENT TECHNOLOGY (SHENZHEN) COMPANY LIMITED, Shenzhen (CN)

(72) Inventors: Jun Cheng, Shenzhen (CN); Ying Zhu, Shenzhen (CN); Haoyuan Li, Shenzhen (CN); Feng Li, Shenzhen (CN); Xiaoxiang Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 79 days.

(21) Appl. No.: 16/997,887

(22) Filed: Aug. 19, 2020

(65) Prior Publication Data

US 2020/0380690 A1    Dec. 3, 2020

Related U.S. Application Data

(63) Continuation of application No. PCT/CN2019/092586, filed on Jun. 24, 2019.

(30) Foreign Application Priority Data

Jul. 11, 2018 (CN) .......................... 201810755907.7

(51) Int. Cl.
    *G06T 7/11*    (2017.01)
    *G06T 7/143*   (2017.01)
    (Continued)

(52) U.S. Cl.
    CPC ................ *G06T 7/11* (2017.01); *G06T 7/143* (2017.01); *G06V 40/165* (2022.01); *G06V 40/28* (2022.01); *G06T 2207/30201* (2013.01)

(58) Field of Classification Search
    CPC . G06T 7/11; G06T 7/143; G06T 2207/30201; G06T 11/00; G06T 7/10;
    (Continued)

(56) References Cited

U.S. PATENT DOCUMENTS

| 9,330,718 B2 * | 5/2016 | Middleton ........... G11B 27/031 |
| 2018/0012330 A1 * | 1/2018 | Holzer .................... G06T 11/60 |
| 2018/0249200 A1 | 8/2018 | Wang et al. |

FOREIGN PATENT DOCUMENTS

CN             105791692 A        7/2016

OTHER PUBLICATIONS

The World Intellectual Property Organization (WIPO), International Search Report for PCT/CN2019/092586, dated Oct. 8, 2019, 5 Pages (including translation).

\* cited by examiner

*Primary Examiner* — Phuoc Tran
(74) *Attorney, Agent, or Firm* — Anova Law Group, PLLC

(57) ABSTRACT

This application relates to an image processing method and apparatus, a storage medium, and a computer device. The method includes obtaining acquired image frames; identifying, in each obtained image frame, a target area and a reference area that are obtained through image semantic segmentation; detecting, when a location relationship between the target area and the reference area in an obtained first image frame meets an action start condition and a location relationship between the target area and the reference area in an obtained second image frame meets an action end condition, an action to trigger adding an additional element, the second image frame being acquired after the first image frame; obtaining the additional element when the triggering action is detected; and adding the additional (Continued)

element to image frames acquired after the second image frame.

18 Claims, 9 Drawing Sheets

(51) Int. Cl.
*G06V 40/20* (2022.01)
*G06V 40/16* (2022.01)

(58) Field of Classification Search
CPC ...... G06T 11/60; G06V 40/165; G06V 40/28; G06F 3/017
See application file for complete search history.

(a)          (b)

(a) (b)

(a) (b)

IMAGE PROCESSING METHOD, APPARATUS, AND STORAGE MEDIUM

RELATED APPLICATION

This application claims priority to PCT Application No. PCT/CN2019/092586, filed on Jun. 24, 2019, which claims priority of Chinese Patent Application No. 201810755907.7, entitled "IMAGE PROCESSING METHOD AND APPARATUS, STORAGE MEDIUM, AND COMPUTER DEVICE" and filed on Jul. 11, 2018. The two applications are both incorporated herein by reference in their entirety.

FIELD OF THE TECHNOLOGY

This application relates to the field of computer technologies, and in particular, to an image processing method and apparatus, a storage medium, and a computer device.

BACKGROUND OF THE DISCLOSURE

With the development of computer technologies, the image processing technology is also continuously improved. A user may process an image through professional image processing software, so that the processed image has better performance. The user may further attach, through the image processing software, an element provided by the image processing software to the image, so that the processed image can transfer more information.

However, in a current image processing manner, the user needs to open an element library of the image processing software, browse the element library, select a suitable element from the library, and adjust a location of the element in the image, to confirm the modification, and complete the image processing. Therefore, the current image processing manner requires a lot of manual operations and is time-consuming, causing low efficiency of the image processing process.

SUMMARY

An image processing method and apparatus, a storage medium, and a computer device are provided, which can resolve the problem of low image processing efficiency at present.

One aspect of the present disclosure provides an image processing method that is applied to an image processing system. The method includes obtaining acquired image frames; identifying, in each obtained image frame, a target area and a reference area that are obtained through image semantic segmentation; detecting, when a location relationship between the target area and the reference area in an obtained first image frame meets an action start condition and a location relationship between the target area and the reference area in an obtained second image frame meets an action end condition, an action to trigger adding an additional element, the second image frame being acquired after the first image frame; obtaining the additional element when the triggering action is detected; and adding the additional element to image frames acquired after the second image frame.

Another aspect of the present disclosure provides an image processing apparatus. The apparatus includes an obtaining module, configured to obtain acquired image frames; a determining module, configured to identify, in each acquired image frame, a target area and a reference area that are obtained through image semantic segmentation; a detecting module, configured to detect, when a location relationship between the target area and the reference area in an obtained first image frame meets an action start condition and a location relationship between the target area and the reference area in an obtained second image frame meets an action end condition, an action to trigger adding an additional element, the second image frame being acquired after the first image frame; and an adding module, configured to obtain the additional element when the triggering action is detected, and add the additional element to image frames acquired after the second image frame.

Another aspect of the present disclosure provides a computer-readable storage medium. The computer-readable storage medium stores a computer program. The computer program, when executed by a processor, causes the processor to perform the method, including obtaining acquired image frames; identifying, in each obtained image frame, a target area and a reference area that are obtained through image semantic segmentation; detecting, when a location relationship between the target area and the reference area in an obtained first image frame meets an action start condition and a location relationship between the target area and the reference area in an obtained second image frame meets an action end condition, an action to trigger adding an additional element, the second image frame being acquired after the first image frame; obtaining the additional element when the triggering action is detected; and adding the additional element to image frames acquired after the second image frame.

In the image processing method and apparatus, the storage medium, and the computer device, after acquired image frames are obtained by the device, a target area and a reference area that are identified through image semantic segmentation are automatically determined in each obtained image frame. The device then determines whether there is an action of triggering adding an additional element according to a location relationship between the target area and the reference area in the plurality of image frames. Accordingly, the additional element can be automatically added to subsequently acquired image frames when the action is determined, thereby avoiding complex steps of manual operations, and greatly improving image processing efficiency.

DESCRIPTION OF EMBODIMENTS

To make the objectives, technical solutions, and advantages of this application clearer and more comprehensible, the following further describes this application in detail with reference to the accompanying drawings and the embodiments. It is to be understood that the specific embodiments described herein are only used for describing this application, but are not intended to limit this application.

Figure 1:
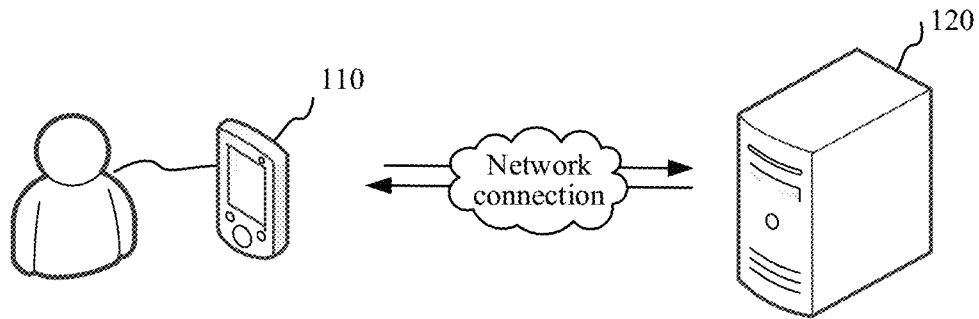
FIG. 1 is a diagram of an application environment of an image processing method according to an embodiment.

FIG. 1 is a diagram of an application environment of an image processing method according to an embodiment. Referring to FIG. 1, the image processing method is applied to an image processing system. The image processing system includes a terminal 110 and a server 120. The terminal 110 is connected to the server 120 through a network. Both the terminal 110 and the server 120 may perform the image processing method. The terminal 110 may be specifically a desktop terminal or a mobile terminal, and the mobile terminal may be specifically at least one of a mobile phone, a tablet computer, a notebook computer, or the like. The server 120 may be specifically an independent server, or may be a server cluster formed by a plurality of independent servers.

The terminal 110 may obtain acquired image frames, the image frames may be acquired by the terminal 110 through a built-in image acquisition device or an externally connected image acquisition device, and the built-in image acquisition device may be specifically a front-facing camera or a rear-facing camera of the terminal 110. Alternatively, the image frames may be acquired by other computer devices and sent to the terminal 110. Then the terminal 110 may determine, in each obtained image frame, a target area and a reference area that are obtained through image semantic segmentation, and determine, when a location relationship between a target area and a reference area in an image frame having a previous acquisition time meets an action start condition, and a location relationship between a target area and a reference area in an image frame having a later acquisition time meets an action end condition, that an action of triggering adding an additional element is detected. Accordingly, the terminal 110 may obtain the additional element when the action is detected and add the obtained additional element to image frames acquired after the image frame having the later acquisition time.

Alternatively, the terminal 110 may send the obtained image frames to the server 120, and when determining that a location relationship between a target area and a reference area in an image frame having a previous acquisition time meets an action start condition and a location relationship between a target area and a reference area in an image frame having a later acquisition time meets an action end condition, the server 120 instructs the terminal 110 to detect an action of triggering adding an additional element. Then the terminal 110 obtains the additional element and adds the obtained additional element to an image frame acquired after the image frame having the later acquisition time.

Alternatively, the terminal 110 may send the obtained image frames to the server 120, and the server 120 determines, when a location relationship between a target area and a reference area in an image frame having a previous acquisition time meets an action start condition and a location relationship between a target area and a reference area in an image frame having a later acquisition time meets an action end condition, that an action of triggering adding an additional element is detected, obtains the additional element, adds the obtained additional element to an image frame acquired after the image frame having the later acquisition time, and feeds back the image frame to which the additional element is added to the terminal 110.

Figure 2:
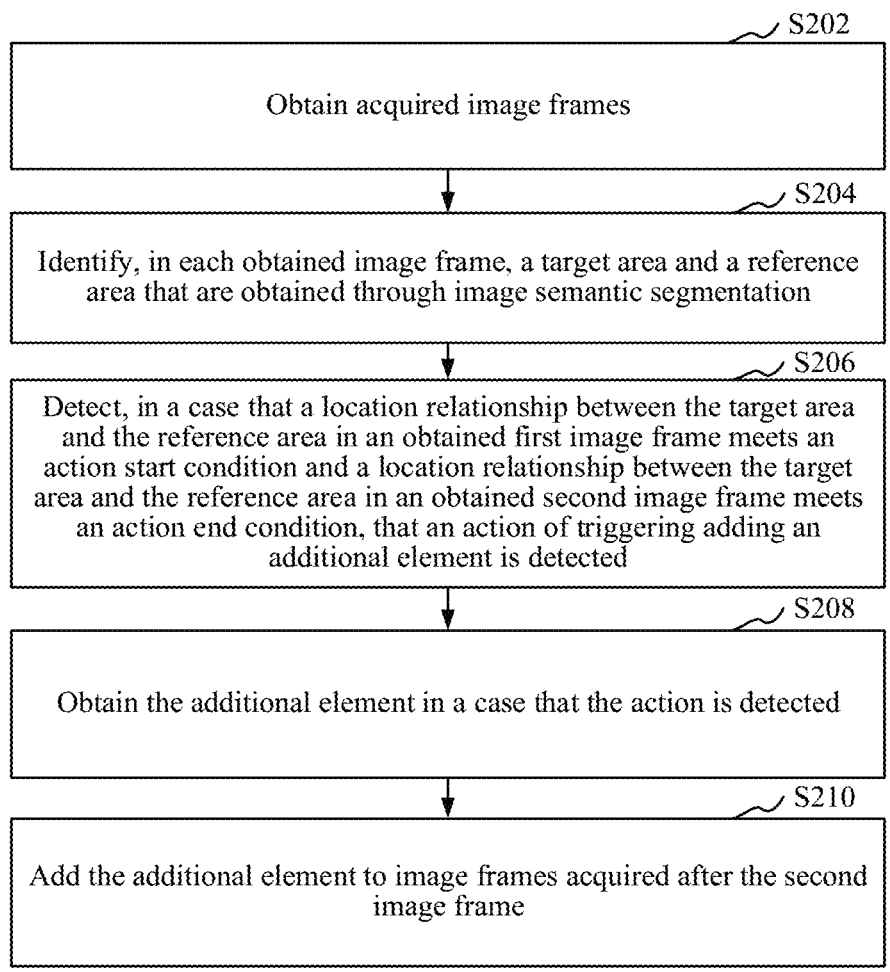
FIG. 2 is a schematic flowchart of an image processing method according to an embodiment.

FIG. 2 is a schematic flowchart of an image processing method according to an embodiment. In this embodiment, an example in which the image processing method is applied to a computer device is used for description. The computer device may be the terminal 110 or the server 120 in FIG. 1. Referring to FIG. 2, the method specifically includes the following steps:

S202. Obtain acquired image frames.

The image frames are data obtained by imaging an imaging target through a physical imaging principle.

In one embodiment, when the computer device is a terminal, the terminal may specifically acquire image frames at a fixed or dynamic frame rate and obtain the acquired image frames. The image frames are acquired at the fixed or dynamic frame rate, so that the image frames can be played at the fixed or dynamic frame rate, to form a continuous dynamic picture.

In one embodiment, when the computer device is a terminal, the terminal may acquire, by using a built-in or externally connected image acquisition device, image frames within a current shooting range of the image acquisition device, and obtain the acquired image frames. The shooting range of the image acquisition device may vary with a posture and a location of the terminal. The image acquisition device of the terminal may specifically include a front-facing camera or a rear-facing camera.

In one embodiment, when the computer device is a terminal, the terminal may acquire image frames through a shooting mode provided by a social application, and obtain the acquired image frames. The social application is an application capable of performing network social interaction based on a social network. The social application includes an instant messaging application, a social network service (SNS) application, a live streaming application, a photography application, or the like.

In one embodiment, when the computer device is a terminal, the terminal may receive image frames sent by another terminal and acquired by another terminal, and obtain the received image frames. For example, when setting up a video session by using a social application running on the terminal, the terminal receives image frames acquired and sent by a terminal corresponding to another session party.

In one embodiment, when the computer device is a terminal, the terminal may acquire image frames through a shooting mode provided by a live streaming application, and use the acquired image frames as live streaming data, to perform live streaming through the live streaming application. Alternatively, the terminal may receive image frames sent by another terminal and acquired by the another terminal through a shooting mode provided by a live streaming application, and use the received image frames as live streaming data, to play, through the live streaming application, live streaming initiated by another user through the live streaming application.

In one embodiment, when the computer device is a server, the terminal in the foregoing embodiment may upload image frames to the server after obtaining the image frames, so that the server obtains the acquired image frames.

In a specific embodiment, the computer device is a terminal. A video recording application is installed on the terminal. The terminal may run the video recording application according to a user instruction, invoke a built-in camera of the terminal through the video recording application to acquire image frames, and obtain the acquired image frames in real time according to an acquisition time sequence of the image frames when acquiring the image frames.

In the foregoing embodiment, the frame rate of the image frame obtained by the computer device is less than or equal to the frame rate of the image frame acquired by the image acquisition device.

S204. Determine, in the obtained image frames, a target area and a reference area that are obtained through image semantic segmentation.

The image semantic segmentation is to segment pixels in an image according to different expressed semantics. The image semantic segmentation is used for segmenting the image into a plurality of pixel areas according to semantics. Essentially, the image semantic segmentation implements image pixel-level classification, and a semantic annotation of an entire image is implemented through pixel classification. A classification unit is not limited in this embodiment of this application, and the image may be classified pixel by pixel, or may be classified according to image blocks. One image block includes a plurality of pixels.

The target area is an area used as a target for detecting an action in an image frame. The reference area is an area used as a reference for detecting an action in an image frame. In different image frames, the target area is a dynamic area, and the reference area is a static area. A location relationship between the target area and the reference area varies in the different image frames. It may be understood that the static area herein is not absolute static and is a static area relative to the target area.

For example, when a camera acquires image frames, a user makes an action of brushing hair aside. Because brushing hair aside is a continuous action, in a series of image frames that are acquired by the camera when the user makes an action of brushing hair aside, the hand is an execution part of the action of brushing hair aside, and therefore the hand area is a target area and dynamically changes in different image frames; and the face is a reference part of the action of brushing hair aside, and therefore the face area is a reference area and is static relative to the hand. In this scenario, the target area is a dynamic area, and the reference area is a relative static area.

In another example, when the camera acquires image frames, the user makes a jumping action. Because jumping is a continuous action, in a series of image frames that are acquired by the camera when the user jumps, a body is an execution part of the jumping action, and therefore the body area is a target area and dynamically changes in different image frames. For ease of calculation, a foot area (a body local area) may alternatively be selected as the target area. The ground is a reference part of the jumping action, and therefore the ground area is the reference area. In this scenario, the reference area is an absolute static area.

Specifically, the terminal may encode an obtained image frame into a semantic segmentation feature matrix, then decode the semantic segmentation feature matrix to obtain a semantic segmentation image, then segment a target area from the semantic segmentation image according to pixels belonging to a target category, and segment a reference area from the semantic segmentation image according to pixels belonging to a reference category. The pixels in the semantic segmentation image has pixel values representing classification categories to which the pixels belong, and corresponds to pixels in an original image frame of the semantic segmentation image.

A person skilled in the art may understand that the semantic segmentation feature matrix is a low-dimensional expression of semantic features of image content in the image frame, and covers semantic feature information of the entire image frame. The semantic segmentation image is an image segmented into a plurality of areas that do not overlap with each other and that have particular semantics. The pixel values of the pixels in the semantic segmentation image are used for reflecting the classification categories to which the corresponding pixels belong. The pixel classification may be two-class classification, or may be multi-class classification. The pixel two-class classification means that the pixels in the semantic segmentation image are classified into two different pixel values, and are used for representing two different classification categories, for example, pixels corresponding to a road and other pixels in a map image. The pixel multi-classification means that the pixels in the semantic segmentation image are classified into two or more pixel values, and are used for representing two or more classification categories, for example, pixels corresponding to the sky, pixels corresponding to the earth, and pixels corresponding to a person in a scenery map. An image size of the semantic segmentation image is consistent with an image size of the original image frame. Accordingly, it may be understood that the original image frame is classified pixel by pixel, and a category to which each pixel in the original image frame belongs may be obtained according to the pixel values of the pixels in the semantic segmentation image.

S206. Determine, when a location relationship between the target area and the reference area in an obtained first image frame meets an action start condition and a location relationship between the target area and the reference area in an obtained second image frame meets an action end condition, that an action of triggering adding an additional element is detected.

The first image frame and the second image frame are any obtained image frame, and the second image frame is acquired after the first image frame.

The action start condition is a constraint condition of determining to start to perform a specific action. The action end condition is a constraint condition of performing the specific action. Because the action is a continuous process, it may be understood that the detected action can be determined only when both the image frame meeting the action start condition and the image frame meeting the action end condition are obtained.

For example, when a camera acquires an image frame, a user makes an action of brushing hair aside. Because brushing hair aside is a continuous action, the action of brushing hair aside is determined only when it is detected that the user starts to brush hair aside and then the user is brushing hair aside. However, if the user immediately stops the action after starting to brush hair aside, it cannot be considered that the action of brushing hair aside is detected.

In another example, when the camera acquires an image frame, the user makes a jumping action. Because the jumping is a continuous action, the jumping action is determined only when it is detected that the user jumps and then the user leaves the ground (being jumping). However, if the user immediately stops the action after jumping without leaving the ground, it cannot be considered that the jumping action is detected.

The action of triggering adding the additional element is triggering an action of adding the additional element to the acquired image frames. The action of triggering adding the additional element is, for example, the action of brushing hair aside, an action of covering face, or an action of touching chin. The additional element is data used for being additionally added to the image frame. The additional element may be specifically a decoration element, for example, a pendant. The decoration element is data that is used for decoration and that can be displayed in a visual form. The additional element is, for example, data displayed in the image frame to decorate image content. The additional element is, for example, a mask, an armor, a ribbon, a blue sky, or a white cloud. The type of the additional element is not limited in this embodiment of this application. The additional element may be dynamic data, for example, a dynamic picture; or may be static data, for example, a static picture.

In one embodiment, there may be one or more actions of triggering adding the additional element. When there are a plurality of actions of triggering adding the additional element, different actions may correspond to the same action start condition, or correspond to the same action end condition. The plurality of actions may trigger adding a unified additional element to a unified location in the image frame, or may trigger adding a unified additional element to different locations in the image frame, or may trigger adding different additional elements to different locations in the image frame respectively.

It may be understood that, a sequence involved in the previous acquisition time and the later acquisition time herein means that the acquisition time of the image frame in which the location relationship between the target area and the reference area meets the action start condition is before the acquisition time of the image frame in which the location relationship between the target area and the reference area meets the action end condition.

S208. Obtain the additional element when the action is detected.

Specifically, when detecting an action, the terminal may query a pre-established correspondence between actions and additional elements, and query, according to the correspondence, for an additional element corresponding to the detected action, to obtain the found additional element.

In one embodiment, there may be one or more additional elements corresponding to the action. When there may be a plurality of additional elements corresponding to the action, the terminal may randomly select an additional element from the plurality of additional elements, or may select, according to a user label of a current logged-in user identifier, an additional element matching the user label.

S210. Add the additional element to image frames acquired after the second image frame.

It may be understood that the second image frame herein is an image frame in which the location relationship between the target area and the reference area meets the action end condition, and is an image frame acquired after the first image frame in which the location relationship between the target area and the reference area meets the action start condition.

Specifically, after determining that the action of triggering adding the additional element is detected, the computer device may use an image frame (that is, an image frame having a later acquisition time) in which a location relationship between a target area and a reference area meets the action end condition as a demarcation frame, and add the additional element to image frames of which the acquisition time is later than that of the demarcation frame. The image frames to which the additional element is added may be all image frames acquired after the acquisition time of the demarcation frame, or may be some image frames acquired after the acquisition time of the demarcation frame, or may include the demarcation frame.

In a specific embodiment, the computer device is a terminal. A video recording application is installed on the terminal. The terminal may run the video recording application according to a user instruction, invoke a built-in camera of the terminal through the video recording application to acquire image frames, and obtain the acquired image frames in real time according to an acquisition time sequence of the image frames when acquiring the image frames. It may be understood that the camera acquiring image frames is a real-time and continuous process and the terminal obtaining the acquired image frames is also a real-time and continuous process. Each time the terminal obtains one image frame, the terminal determines whether a location relationship between a target area and a reference area in the image frame meets the action start condition. When the location relationship meets the action start condition, the terminal determines whether an obtained next image frame meets the action end condition, and when the obtained next image frame meets the action end condition, the terminal adds an additional element starting from the obtained next image frame (which may include the current image frame meeting the action end condition).

For example, the terminal acquires a series of image frames P1, P2, . . . , Pi, Pi+1, . . . , Pn in real time, and the image frames are arranged according to an acquisition time sequence. The terminal determines that a location relationship between a target area and a reference area in the image frame P2 meets the action start condition, and determines that a location relationship between a target area and a reference area in the image frame Pi meets the action end condition, so as to determine that an action of triggering adding an additional element is detected. Accordingly, the terminal may add the additional element starting from Pi or Pi+1.

In the image processing method, after acquired image frames are obtained, a target area and a reference area that are obtained through image semantic segmentation are automatically determined in each obtained image frame, and then whether there is an action of triggering adding an additional element is determined according to a location relationship between the target area and the reference area in the plurality of image frames. Accordingly, the additional element can be automatically added to a subsequently acquired image frame when the action is determined, thereby avoiding complex steps of manual operations, and greatly improving image processing efficiency.

In one embodiment, S204 includes the following steps: inputting the obtained image frame to an image semantic segmentation model, outputting a target area probability distribution matrix and a reference area probability distribution matrix through the image semantic segmentation model, determining the target area in the obtained image frame according to the target area probability distribution matrix, and determining the reference area in the obtained image frame according to the reference area probability distribution matrix.

The image semantic segmentation model is a machine learning model trained with a semantic segmentation function. An English full name is machine learning, ML for short The ML model may have a specific capability through sample learning. The ML model may be a neural network model, a support vector machine, a logistic regression model, or the like. The neural network model is, for example, a convolutional neural network.

In this embodiment, the image semantic segmentation model is specifically a neural network model. The neural network model may be specifically a convolutional neural network (CNN) model. A convolution layer of the CNN model includes a plurality of convolution kernels. The convolution kernel is an operator used by the convolution layer to perform a convolution operation on an input. Each convolution kernel may obtain an output after performing the convolution operation on the input. A pooling layer of the neural network model is also referred to as a sampling layer, is used for compressing an input, and generally has two forms: mean pooling and max pooling. The pooling may be considered as a special convolution process.

The image semantic segmentation model may be understood as a classifier, and is configured to classify pixels included in an inputted image frame pixel by pixel. A quantity of classification categories of the image semantic segmentation model may be user-defined and controlled during training. In this embodiment, the image semantic segmentation model is set as a multi-classifier, and the classification categories include three types: a target category, a reference category, and a background category. When an image frame is inputted into a model, pixels belonging to the target category are pixels of a target area, pixels belonging to the reference category are pixels of a reference area, and pixels belonging to the background category are pixels of a background area. Accordingly, the pixels may be classified according to the categories to which the pixels belong, to determine the target area and the reference area in an obtained image frame.

For example, when the action of triggering adding the additional element is an action of brushing hair aside, the target category is a hand category, and the reference category is a face category. Pixels belonging to the hand category in an obtained image frame are pixels of the hand area, and pixels belonging to the face category are pixels of the face area. Accordingly, the pixels may be classified according to the categories to which the pixels belong, to determine the hand area and the face area in the obtained image frame.

A matrix element of the target area probability distribution matrix has a value representing a probability of the matrix element belonging to the target category and corresponds to pixels in the image frame inputted into the model. That is, assuming that the image frame inputted into the model is 2*2, the target area probability distribution matrix is also 2*2, and a value of a matrix element at a matrix location (m, n) is a probability of pixels at a pixel location (m, n) in the image frame belonging to the target category. The matrix (the image frame) uses a matrix location (a pixel location) at the upper left corner as (0, 0).

Similarly, a matrix element of the reference area probability distribution matrix has a value representing a probability of the matrix element belonging to the reference category and corresponds to pixels in the image frame inputted into the model. That is, assuming that the image frame inputted into the model is 2*2, the reference area probability distribution matrix is also 2*2, and a value of a matrix element at a matrix location (m, n) is a probability of pixels at a pixel location (m, n) in the image frame belonging to the reference category.

Specifically, the terminal may input the obtained image frame into a pre-trained image semantic segmentation model, and output a target area probability distribution matrix and a reference area probability distribution matrix through the image semantic segmentation model. Then the terminal may determine an area enclosed by pixels corresponding to a matrix element whose probability value is greater than a preset probability in the target area probability distribution matrix as a target area, and determine an area enclosed by pixels corresponding to a matrix element whose probability value is greater than a preset probability in the reference area probability distribution matrix as a reference area. The preset probability is a preset demarcation value used for determining whether the pixels are classified into the current category.

Figure 3:
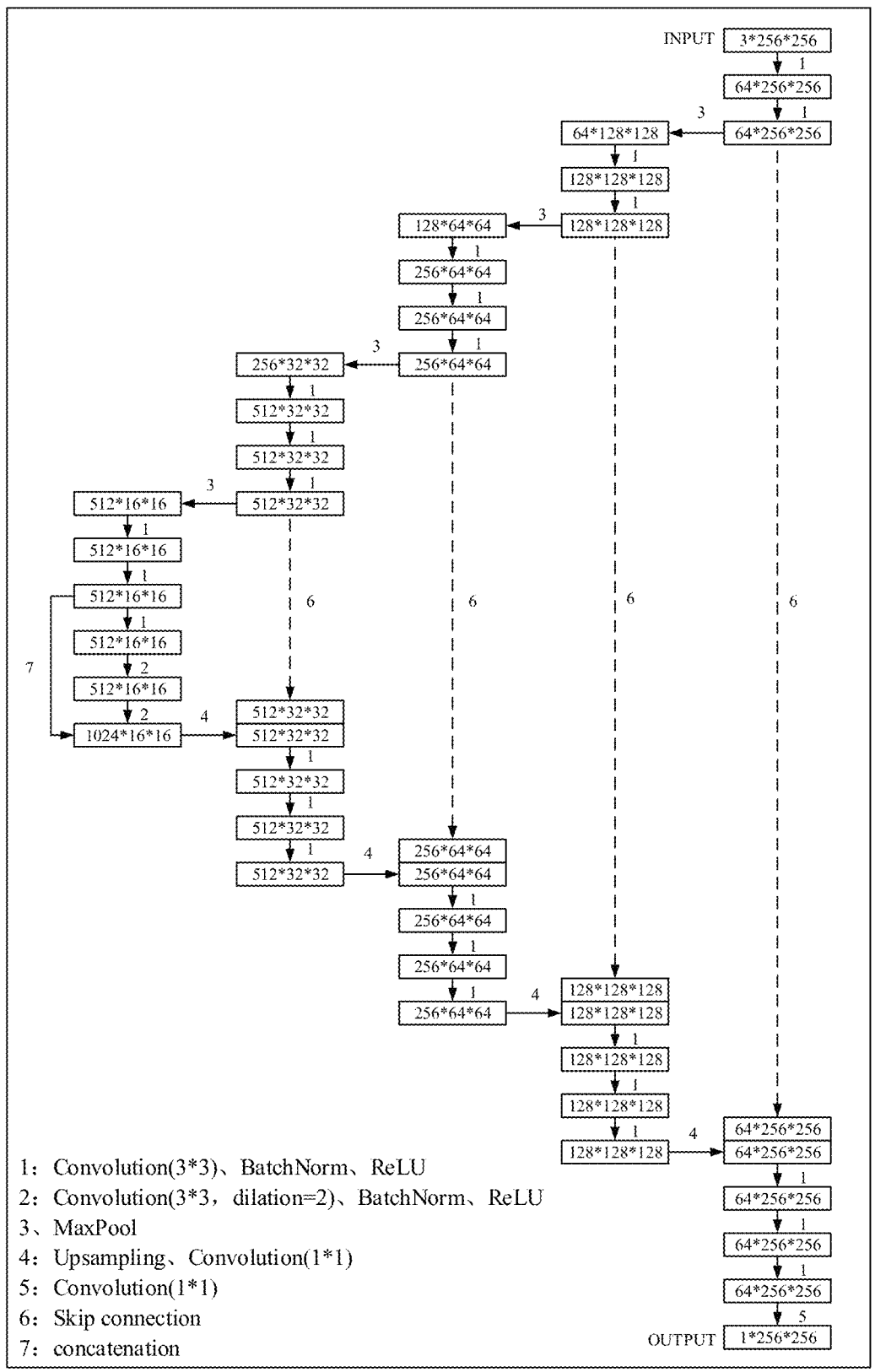
FIG. 3 is a schematic principle diagram of processing obtained image frames by an image semantic segmentation model according to a specific embodiment.

FIG. 3 is a schematic principle diagram of processing an obtained image frame by an image semantic segmentation model according to a specific embodiment. Referring to FIG. 3, the image semantic segmentation model is a U-shaped symmetrical model, and an output of a previous network layer is used as an input of a network layer at a corresponding location through a skip connection. An input of the image semantic segmentation model is a feature map (for example, an RGB three-channel feature map) of an obtained image frame, a network layer in the image semantic segmentation model operates a feature map inputted into the network layer to obtain a feature map output, and an output of the image semantic segmentation model may be a semantic segmentation image, or may be a probability distribution matrix, which is determined according to a sample and a label during training. In the figure, m in m*n*k (for example, 3*256*256 or 64*256*256) represents a quantity of feature maps, and n*k represents a size of the feature map. It may be understood that parameters in the figure are all examples, and model parameters actually used are not limited. Operations performed by the network layer on the feature map include: convolution, batchnorm, relu, maxpool, upsampling, and the like.

In the foregoing embodiment, after the image frame is obtained, the image frame is inputted automatically into a trained ML model, and the target area and the reference area are determined according to the target area probability distribution matrix and the reference area probability distribution matrix outputted by the ML model. The matrix element in the probability distribution matrix has a value representing a probability of corresponding pixels in the image frame belonging to a particular classification category. Accordingly, the target area may be automatically determined according to pixels belonging to the target category, and the reference area may be determined according to pixels belonging to the reference category, thereby improving accuracy of image area segmentation, and providing a basis for subsequently determining whether the action start condition or the action end condition is met.

In one embodiment, the target area is a hand area, and the reference area is a face area. The image processing method further includes: determining a gesture type corresponding to the hand area in the obtained image frame. When the gesture type is a gesture type of triggering adding an additional element, whether a location relationship between a target area and a reference area in the obtained image frame meets an action start condition may be determined.

The determining, when a location relationship between the target area and the reference area in a first image frame meets an action start condition and a location relationship between the target area and the reference area in a second image frame meets an action end condition, that an action of triggering adding an additional element is detected includes: determining, when a gesture type of the first image frame is a trigger type, a location relationship between a hand area and a face area in the first image frame meets the action start condition and a location relationship between a hand area and a face area in the second image frame meets the action end condition, that the action of triggering adding the additional element is detected.

The hand and the face are both body parts of an organism (a person or an animal). The hand area is an area in which the hand is located. The hand area may be an area enclosed within a hand profile, or may be a regular area including the hand and a high hand ratio. The face area may be an area enclosed by a face profile, or may be a regular area including the face and a face ratio is high. The gesture is an action form that is made by a user through a hand. The gesture type is a type to which the gesture in the obtained image frame belongs.

Figure 4:
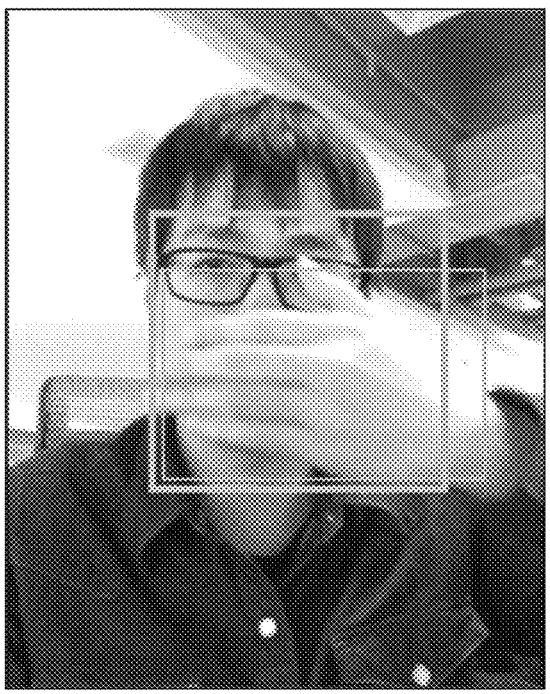
FIG. 4 is a schematic diagram of segmenting a hand area from an obtained image frame according to an embodiment.
Figure 4:

FIG. 4 is a schematic diagram of segmenting a hand area from an obtained image frame according to an embodiment. FIG. 4(a) shows an obtained image frame, and the terminal may determine a hand area 401 in the image frame through image semantic segmentation. FIG. 4(b) shows an image obtained by segmenting, according to a regular shape, a hand area from an obtained image frame including the hand area.

It may be understood that, compared with directly recognizing a gesture type corresponding to a hand area in an obtained original image, after the hand area is segmented from the obtained original image, the segmented hand area is recognized, so that the problem of inaccurate recognition of the hand area when a proportion of the hand area to the entire image is relatively small is avoided, and interference of a background area relative to the hand area in the original image to a gesture type of a gesture in the hand area can be reduced, thereby improving accuracy of the recognition.

Specifically, the computer device may recognize, by using a pre-trained gesture recognition model, the gesture type to which the gesture belongs in the image frame. A hand area is captured from an obtained image frame to obtain a hand image, the hand image is inputted into the gesture recognition model, and an operation is performed on a feature corresponding to the hand image by using a hidden layer in the gesture recognition model, to output a gesture type of a gesture in the hand image. When the gesture type is recognized as a gesture type of triggering adding an additional element, whether a location relationship between the hand area and a face area in the obtained image frame meets an action start condition is continuously determined. Otherwise, whether a gesture type corresponding to a hand area in an obtained next image frame is a gesture type of triggering adding an additional element is recognized.

Further, only when recognizing that a gesture type corresponding to a hand area in an obtained image frame is a gesture type of triggering adding an additional element and a location relationship between the hand area and a face area in the image frame meets an action start condition, the terminal continues to determine whether a gesture type corresponding to a hand area in a next image frame obtained after the image frame is the gesture type of triggering adding the additional element, and only when determining that the gesture type corresponding to the hand area in the next image frame is the gesture type of triggering adding the additional element, the terminal continues to determine whether a location relationship between the hand area and a face area in the next image frame meets an action end condition, until detecting that a gesture type corresponding to a hand area in another image frame acquired later is the gesture type of triggering adding the additional element, and when a location relationship between the hand area and a face area in the image frame meets the action end condition, the terminal determines that an action of triggering adding the additional element is detected.

The gesture recognition model is an ML model. When a gesture type that is preset by the computer device and that is used for triggering adding the additional element is unique, the gesture recognition model is a two-class classification model. Image samples used for training the two-class classification model include a positive sample belonging to the gesture type of triggering adding the additional element, and a negative sample not belonging to the gesture type of triggering adding the additional element. When a gesture type that is preset by the computer device and that is used for triggering adding the additional element is diversified, the gesture recognition model is a multi-class classification model. Image samples used for training the multi-class classification model include samples that belong to the gesture types of triggering adding the additional element. The gesture recognition model may specifically use a ConvNet Configuration model as an initial model, and train the initial model according to a training sample, to obtain a model parameter applicable to the gesture recognition.

In one embodiment, the computer device may further perform feature matching between the hand image obtained by capturing the hand area from the obtained image frame and a hand image template belonging to the gesture type of triggering adding the additional element, and when the matching succeeds, determine that the gesture type corresponding to the hand area in the obtained image frame is the gesture type of triggering adding the additional element.

In the foregoing embodiment, in a specific scenario in which the target area is the hand area and the reference area is the face area, only when the gesture type corresponding to the hand area in the obtained image frame is recognized as the gesture type of triggering adding the additional element, whether the action start condition or the action end condition is met is continuously determined, thereby avoiding a waste of resources caused by determining the action start condition or the action end condition in an invalid gesture, and improving the image processing efficiency.

In one embodiment, the determining, when a location relationship between the target area and the reference area in a first image frame meets an action start condition and a location relationship between the target area and the reference area in a second image frame meets an action end condition, that an action of triggering adding an additional element is detected includes: starting timing when the location relationship between the target area and the reference area in the first image frame meets the action start condition, and determining, when a time duration does not reach a preset duration and the location relationship between the target area and the reference area in the second image frame meets the action end condition, that the action of triggering adding the additional element is detected.

It may be understood that, the action is not only continuous but also consistent. Often, the action is completed consistently after starting. For example, for an action of brushing hair aside, only when it is detected that a user starts to brush hair aside and then continues to brush hair aside consistently (that is, it is detected that the user is brushing hair aside within a specific time range), it can be determined that there is the action of brushing hair aside. However, if the user immediately stops the action after starting to brush hair aside and continues to brush hair aside after waiting for a relatively long time, it cannot be considered that the action of brushing hair aside is detected. In another example, for a jumping action, only when it is detected that a user takes off and then consistently leaves the ground (being jumping) after taking off, it can be determined that there is the jumping action. However, if the user immediately stops the action after taking off without leaving the ground and leaves the ground after waiting for a relatively long time, it cannot be considered that the jumping action is detected.

Specifically, each time one image frame is obtained, the computer device determines whether the image frame meets the action start condition, and starts timing when determining that an image frame meets the action start condition. Accordingly, the computer device continues to obtain an image frame during timing, and determines whether the image frame meets the action end condition. Only when a time duration does not reach a preset duration and the continuously obtained image frame meets the action end condition, it is determined that an action of triggering adding an additional element is detected. If the computer device does not detect that an image frame continuously obtained within a timing time period meets the action end condition until the time duration reaches the preset duration, it is determined that the action of triggering adding the additional element is not detected. In this case, the computer device continues to obtain an image frame and does not determine whether the image frame meets the action end condition, but determines whether the image frame meets the action start condition, so that the computer device continues to start timing when determining that an image frame meets the action start condition, to continue to detect the action of triggering adding the additional element. The preset duration is a duration formed by determining the action according to actual experience.

In one embodiment, the image processing method further includes: determining, when a proportion of an intersection of the target area and the reference area in the first image frame to the target area exceeds a first preset value, that the location relationship between the target area and the reference area in the first image frame meets the action start condition, or determining, when a proportion of an intersection of the target area and the reference area in the first image frame to the target area exceeds a second preset value and a center location of the target area is located above a center location of the reference area, that the location relationship between the target area and the reference area in the first image frame meets the action start condition.

The first preset value and the second preset value are preset values. The first preset value may be specifically 0.5, and the second preset value may be specifically 0.2. It may be understood that, that the proportion of the intersection of the target area and the reference area in the obtained image frame to the target area exceeds the first preset value, or the proportion of the intersection of the target area and the reference area in the obtained image frame to the target area exceeds the second preset value and the center location of the target area is located above the center location of the reference area is the location relationship between the target area and the reference area when meeting the action start condition determined according to actual experience.

Figure 5:
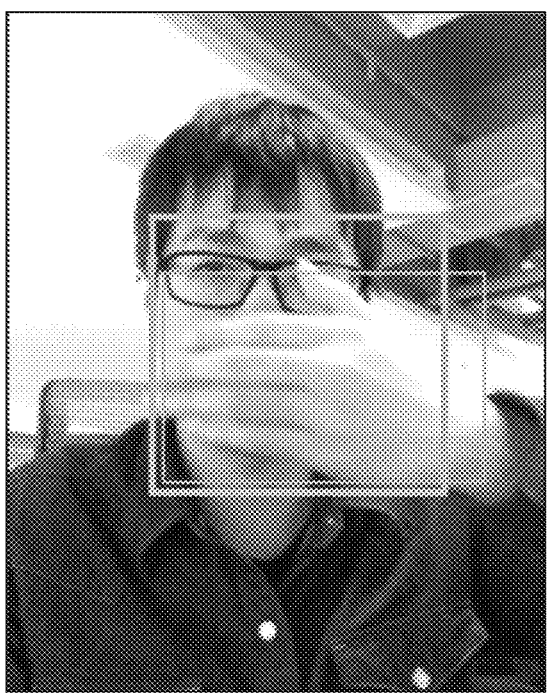
FIG. 5 is a schematic diagram of an image frame meeting an action start condition according to an embodiment.
Figure 5:
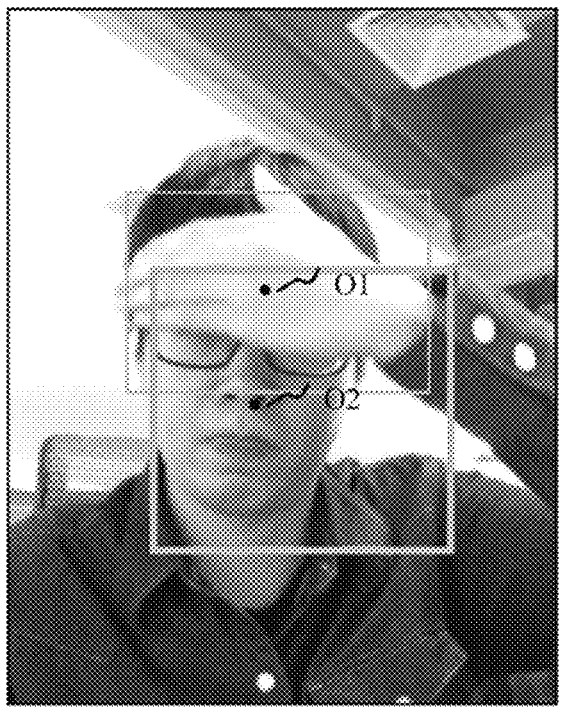

FIG. 5 is a schematic diagram of an image frame meeting an action start condition according to an embodiment. In this embodiment, an action of triggering adding an additional element is an action of brushing hair aside, a target area is a hand area, and a reference area is a face area. Referring to FIG. 5(a), it can be seen that a proportion of an intersection of the hand area and the face area to the hand area exceeds the first preset value (0.5), and it may be determined that a location relationship between the target area and the reference area in the image frame meets the action start condition. Referring to FIG. 5(b), it can be seen that the proportion of the intersection of the hand area and the face area to the hand area exceeds the second preset value (0.2) and a center location O1 of the hand area is located above a center location O2 of the face area, and it may be determined that the location relationship between the target area and the reference area in the image frame meets the action start condition.

In one embodiment, the image processing method further includes: determining a reference location of the reference area in the second image frame, and determining, when the target area in the second image frame is located above the reference location in the reference area, that the location relationship between the target area and the reference area in the second image frame meets the action end condition.

The reference location is a comparison location used for determining whether the location relationship between the target area and the reference area in the image frame meets the action end condition. It may be understood that in the image frame, that the target area is located above the reference location in the reference area is the location relationship between the target area and the reference area when meeting the action end condition determined according to actual experience.

Figure 6:
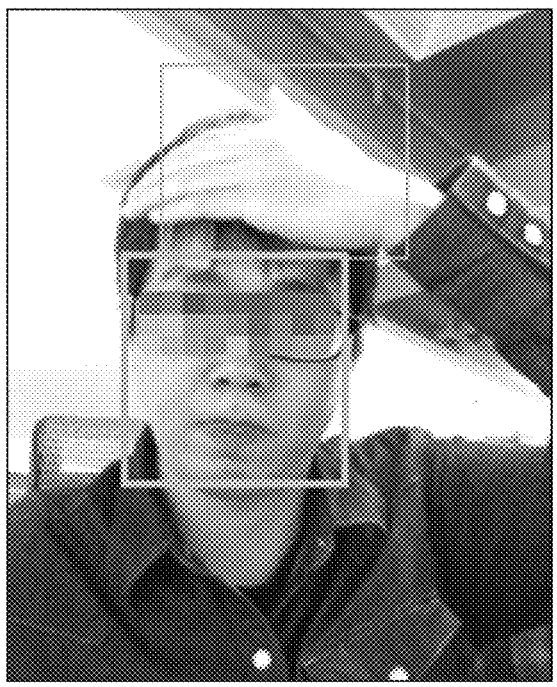
FIG. 6 is a schematic diagram of an image frame meeting an action end condition according to an embodiment.

FIG. 6 is a schematic diagram of an image frame meeting an action end condition according to an embodiment. In this embodiment, an action of triggering adding an additional element is an action of brushing hair aside, a target area is a hand area, a reference area is a face area, and a reference location is locations of eyebrows in the face area. Referring to FIG. 6, it may be seen that the hand area in the image frame is located above the eyebrow locations in the face area, and it may be determined that the location relationship between the target area and the reference area in the image frame meets the action end condition.

In the foregoing embodiment, a basis for specifically determining whether the image frame meets the action start condition or the action end condition is provided, thereby ensuring effective action determining. In addition, only when it is determined that the obtained image frame meets the action start condition, and the image frame continuously obtained within a subsequent preset duration meets the action end condition, it is determined that the action is detected, so that detection of the action conforms to actual cognition and is effective.

It may be understood that determining that the obtained image frame meets the action start condition and the image frame continuously obtained within a subsequent preset duration meets the action end condition indicates that an interval between an acquisition time of the image frame meeting the action start condition and an acquisition time of the image frame meeting the action end condition is less than or equal to the preset duration.

In one embodiment, the target area is a hand area, the reference area is a face area, and the reference location is locations of eyebrows. The adding the additional element to image frames acquired after the second image frame includes: determining, in each image frame acquired after the second image frame, an area formed by the locations of the eyebrows in the face area and a boundary of the hand area close to the locations of the eyebrows, and adaptively adding the additional element to the determined area in the image frame acquired after the second image frame.

Specifically, the computer device may perform face detection on the image frames acquired after the second image frame, to determine left and right eyebrow fiducial points in a face area in the second image frame, determine locations of the eyebrows according to the fiducial points, and then determine an area formed by the locations of the eyebrows in the face area and a boundary of the hand area close to the locations of the eyebrows, to adaptively add the additional element to the determined area.

The adaptively adding the additional element to the determined area may be adjusting a size of the additional element to a size of the determined area. Accordingly, the size of the determined area gradually increases with the action of the hand area, and the additional element gradually increases a display size as the size of the determined area increases. The adaptively adding the additional element to the determined area may alternatively be adding a partial area of the additional element to the determined area. The partial area of the additional element uses a boundary of the additional element as a boundary, and the boundary corresponds to the boundary of the determined area. Accordingly, the size of the determined area gradually increases with the action of the hand area, and the additional element gradually changes from partial display to full display as the size of the determined area increases and the displayed local is increasingly large.

Figure 7:
FIG. 7 is a schematic diagram of an image frame to which an additional element is added according to an embodiment.
Figure 7:
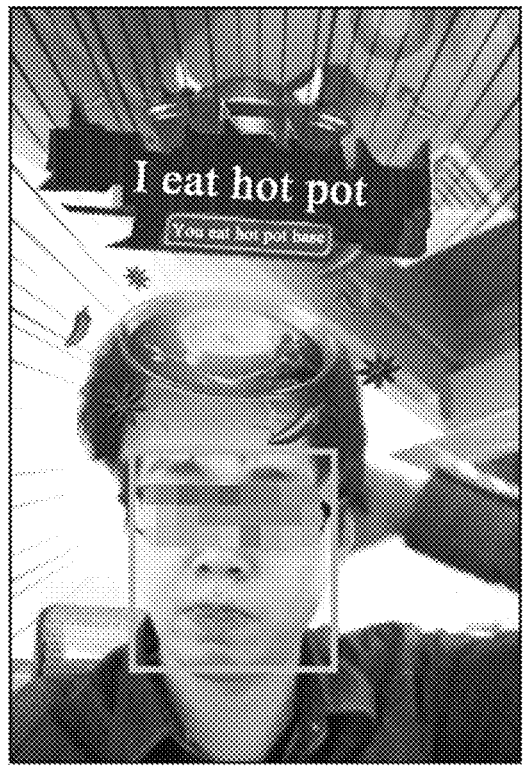

FIG. 7 is a schematic diagram of an image frame to which an additional element is added according to an embodiment. In this embodiment, an action of triggering adding an additional element is an action of brushing hair aside, a target area is a hand area, a reference area is a face area, and a reference location is locations of eyebrows in the face area. Referring to FIG. 7, it may be seen from (a) to (b) that an area formed by locations of eyebrows in a face area and a boundary of a hand area close to the locations of the eyebrows gradually increases, and a size of an additional element added to the area is also increasingly large.

In this embodiment, the additional element is adaptively added to the determined area until added completely instead of directly adding a complete additional element, so that the additional element adding process is not singular or abrupt. By gradually and adaptively adding the additional element according to the movement of the hand area use interactivity is improved.

In another embodiment, the computer device may further perform blurring processing on a boundary of the additional element. In another embodiment, the computer device may further blur or change the color of the addition element based on the time duration between the start and end of the use action. For example, if the user moves quickly (brushing hair aside quickly), the computer device may add an additional element with a bright color. If the user moves slowly (brushing hair aside slowly), the computer device may add an additional element with a muted color.

In one embodiment, the image processing method further includes: playing the obtained image frames frame by frame according to an acquisition time sequence when the action of triggering adding the additional element is not detected, and playing the image frames to which the additional element is added frame by frame according to the acquisition time sequence after the action of triggering adding the additional element is detected.

Specifically, after acquiring an image frame, the computer device may play the acquired image frame in real time. When the action of triggering adding the additional element is not detected, that is, the additional element does not need to be added to a currently acquired image frame, the acquired image frame may be directly rendered to form a preview picture, and the acquired image frame is displayed. After the action of triggering adding the additional element is detected, that is, the additional element needs to be added to the currently acquired image frame, the additional element is added to the image frame acquired after the action of triggering adding the additional element is detected, and the image frame to which the additional element is added is rendered to form a preview picture, and the image frame to which the additional element is added is displayed.

In this embodiment, in a shooting process, the action of triggering adding the additional element is detected for the acquired image frame, and the preview picture is generated in real time according to an acquired video frame and the image frame to which the additional element is added, for a user to watch. Accordingly, the user may learn content of a recorded video in real time, to correct in time or record again when there is an error.

In one embodiment, the image processing method further includes: replacing corresponding image frames before the additional element is added with the image frames to which the additional element is added, and generating, according to a time sequence of acquisition times of image frames determined after the replacement, a recorded video by using the image frames determined after the replacement, where in the image frames determined after the replacement, acquisition times of the image frames to which the additional element is added are acquisition times of the corresponding image frames before the additional element is added.

The image frames determined/generated after the replacement include image frames originally acquired before the additional element is added, and further includes image frames that are obtained by adding the additional element after the additional element is added. That is, for the plurality of obtained image frames, the additional element is not added to some image frames, and the additional element is added to some image frames. Therefore, the plurality of determined image frames not only include the image frames to which the additional element is not added, that is, the image frames that are originally acquired, but also include the image frames to which the additional element is added, that is, the image frames obtained through the replacement.

An acquisition time of an original image frame (on which the replacement operation is not performed) corresponding to the image frames determined/generated after the replacement is a real acquisition time of the image frame. An acquisition time of an image frame obtained through the replacement in the image frames determined/generated after the replacement is an acquisition time of the corresponding image frame before the additional element is added.

For example, in original acquired image frames A, B, C, and D, the additional element is added starting from the image frame C. The additional element is added to the image frame C to obtain an image frame C1, and the additional element is added to the image frame D to obtain an image frame D1. Therefore, the image frame C is replaced with the image frame C1, the image frame D is replaced with the image frame D1, and image frames determined/generated after the replacement are A, B, C1, and D1, that is, a video is generated by using these image frames.

Specifically, the computer device may replace a corresponding image frame before the additional element is added with an image frame obtained after the additional element is added, then generate, according to a time sequence of acquisition times of the image frames determined after the replacement, a recorded video by using the image frames determined after the replacement. The time sequence of the acquisition times may be a reverse order in time, or may be a chronological order.

Further, after generating the recorded video, the computer device may share the video into a social session, or release the video on a social release platform.

In this embodiment, the acquired image frames are processed automatically and in real time in the shooting process, and the video is generated in real time, thereby avoiding complex steps caused by subsequent manual processing, greatly simplifying operations, and improving video generation efficiency.

Figure 8:
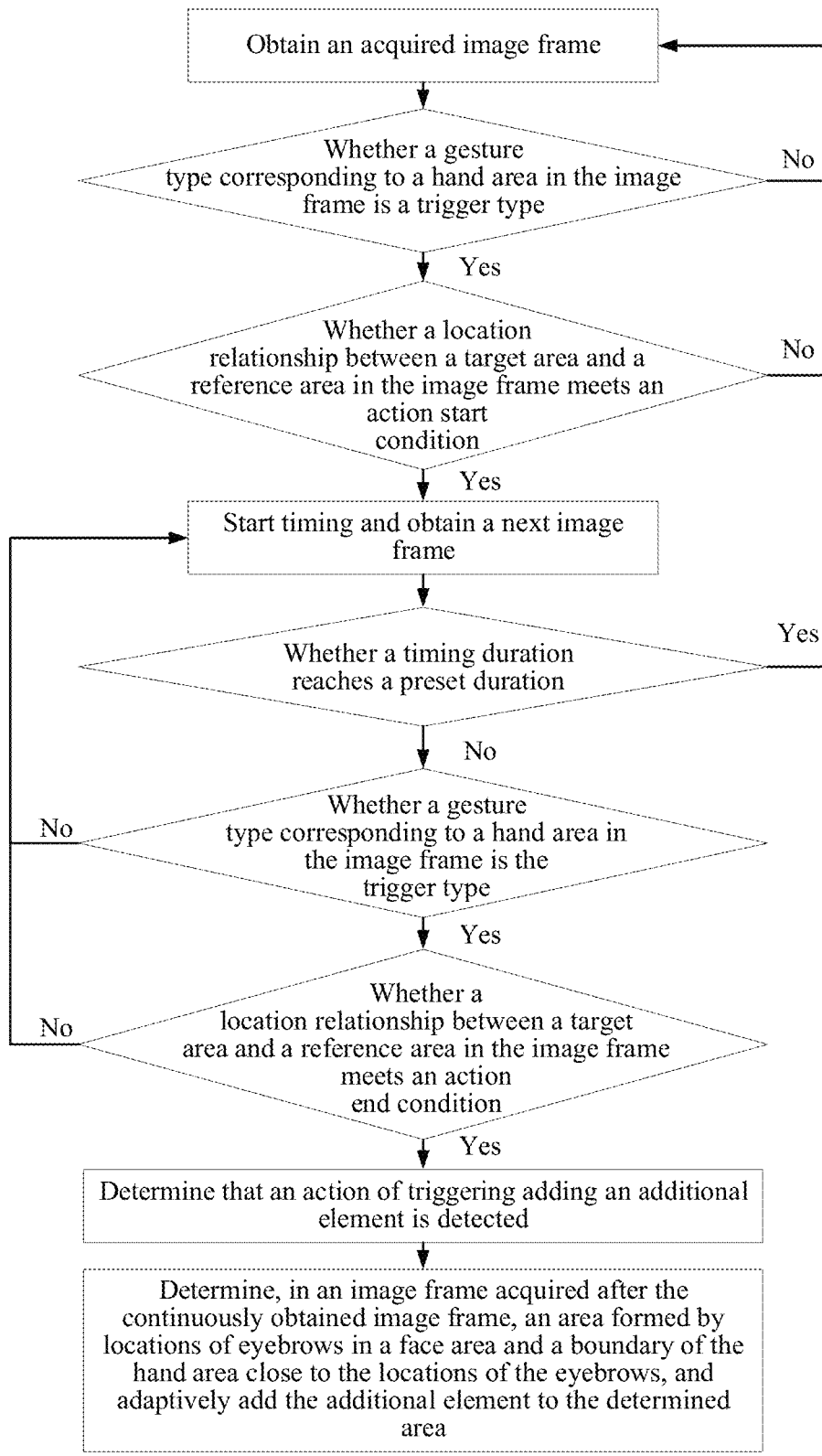
FIG. 8 is a flowchart of an image processing method according to a specific embodiment.

FIG. 8 is a flowchart of an image processing method according to a specific embodiment. In this embodiment, an action of triggering adding an additional element is an action of brushing hair aside, a target area is a hand area, a reference area is a face area, and a reference location is locations of eyebrows in the face area. The computer device is a terminal. A video recording application is installed on the terminal. The terminal may run the video recording application according to a user instruction, invoke a built-in camera of the terminal through the video recording application to acquire image frames, and obtain the acquired image frames in real time according to an acquisition time sequence of the image frames when acquiring the image frames.

After obtaining an acquired image frame, the terminal may determine a gesture type corresponding to a hand area in the obtained image frame and determine whether the gesture type is a trigger type. If the gesture type is not the trigger type, a next image frame is obtained and a gesture type corresponding to a hand area in the image frame is continuously determined, and if the gesture type is the trigger type, it is determined whether a location relationship between a target area and a reference area in the image frame meets an action start condition. The action start condition is that a proportion of an intersection of the target area and the reference area in the image frame to the target area exceeds a first preset value, or a proportion of an intersection of the target area and the reference area in the image frame to the target area exceeds a second preset value, and a center location of the target area is located above a center location of the reference area.

When determining that the image frame does not meet the action start condition, the terminal obtains a next image frame and continues to determine a gesture type corresponding to a hand area in the image frame, and when determining that the image frame meets the action start condition, the terminal starts timing and continues to obtain a next image frame. Then the terminal determines a gesture type corresponding to a hand area in the continuously obtained image frame and determines whether the gesture type is the trigger type. If the gesture type is not the trigger type, a next image frame is obtained and a gesture type corresponding to a hand area in the image frame is continuously determined, and if the gesture type is the trigger type, it is determined whether a location relationship between a target area and a reference area in the continuously obtained image frame meets an action end condition. The action end condition is that in the image frame, the target area is located above a reference location in the reference area.

When detecting, when a time duration does not reach a preset duration, that the image frame meets the action end condition, the terminal determines that an action of triggering adding an additional element is detected, determines, in an image frame acquired after the continuously obtained image frame, an area formed by locations of eyebrows in a face area and a boundary of a hand area close to the locations of the eyebrows, and adaptively adds the additional element to the determined area in the image frame acquired after the continuously obtained image frame. When the terminal still does not detect, when the time duration reaches the preset duration, that the image frame meets the action end condition, the terminal obtains a next image frame, continues to determine a gesture type corresponding to a hand area in the image frame, and detects whether the action start condition is met when the gesture type is the trigger type.

During image processing, the terminal may further replace corresponding image frames before the additional element is added with the image frames after the additional element is added and generate, according to a time sequence of acquisition times of image frames determined after the replacement, a recorded video by using the image frame determined after replacement, or may generate, according to a time sequence of acquisition times of image frames determined after the replacement, a recorded video by using the image frames determined after the replacement after the image frame acquisition ends.

It is to be understood that, although the steps in the flowcharts of the foregoing embodiments are sequentially shown according to the indication of arrows, the steps are not necessarily sequentially performed according to the sequence indicated by the arrows. Unless explicitly specified in this application, the sequence of the steps is not strictly limited, and the steps may be performed in other sequences. Moreover, at least some of the steps in the foregoing embodiments may include a plurality of sub-steps or a plurality of stages. The sub-steps or stages are not necessarily performed at the same moment but may be performed at different moments. The sub-steps or stages are not necessarily performed sequentially, but may be performed in turn or alternately with other steps or at least some sub-steps or stages of other steps.

Figure 9:
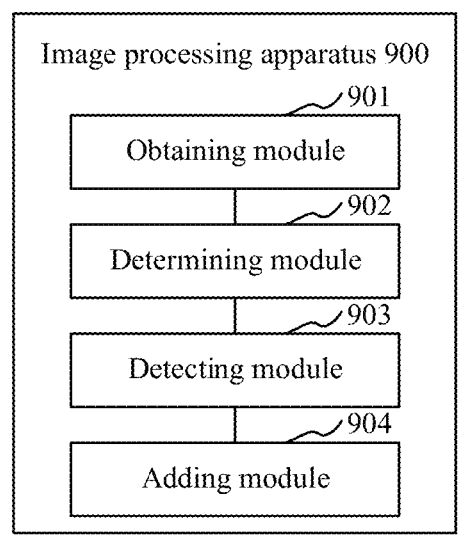
FIG. 9 is a diagram of a module structure of an image processing apparatus according to an embodiment.

As shown in FIG. 9, In one embodiment, an image processing apparatus 900 is provided. Referring to FIG. 9, the image processing apparatus 900 includes: an obtaining module 901, a determining module 902, a detecting module 903, and an adding module 904.

The obtaining module 901 is configured to obtain acquired image frames.

The determining module 902 is configured to determine, in each acquired image frame, a target area and a reference area that are obtained through image semantic segmentation.

The detecting module 903 is configured to determine, when a location relationship between the target area and the reference area in an obtained first image frame meets an action start condition and a location relationship between the target area and the reference area in an obtained second image frame meets an action end condition, that an action of triggering adding an additional element is detected, the second image frame is acquired after the first image frame.

The adding module 904 is configured to obtain the additional element when the action is detected, and add the additional element to image frames acquired after the second image frame.

In one embodiment, the determining module 902 is further configured to input the obtained image frame to an image semantic segmentation model, output a target area probability distribution matrix and a reference area probability distribution matrix through the image semantic segmentation model, determine the target area in the obtained image frame according to the target area probability distribution matrix, and determine the reference area in the obtained image frame according to the reference area probability distribution matrix.

In one embodiment, the target area is a hand area, and the reference area is a face area. The determining module 902 is further configured to determine a gesture type corresponding to the hand area in the obtained image frame. The detecting module 903 is further configured to determine, when a gesture type of the first image frame is a trigger type, a location relationship between the hand area and the face area in the first image frame meets the action start condition and a location relationship between the hand area and the face area in the second image frame meets the action end condition, that the action of triggering adding the additional element is detected.

In one embodiment, the detecting module 903 is further configured to start timing when the location relationship between the target area and the reference area in the first image frame meets the action start condition, and determine, when a time duration does not reach a preset duration and the location relationship between the target area and the reference area in the second image frame obtained after the first image frame meets the action end condition, that the action of triggering adding the additional element is detected.

In one embodiment, the detecting module 903 is further configured to determine, when a proportion of an intersection of the target area and the reference area in the first image frame to the target area exceeds a first preset value, that the location relationship between the target area and the reference area in the first image frame meets the action start condition, or determine, when a proportion of an intersection of the target area and the reference area in the first image frame to the target area exceeds a second preset value and a center location of the target area is located above a center location of the reference area, that the location relationship between the target area and the reference area in the first image frame meets the action start condition.

In one embodiment, the detecting module 903 is further configured to determine a reference location of the reference area in the second image frame, and determine, when the target area in the second image frame is located above the reference location in the reference area, that the location relationship between the target area and the reference area in the second image frame meets the action end condition.

In one embodiment, the target area is a hand area, the reference area is a face area, and the reference location is locations of eyebrows. The adding module 904 is further configured to determine, in each image frame acquired after the second image frame, an area formed by the locations of the eyebrows in the face area and a boundary of the hand area close to the locations of the eyebrows, and add the additional element to the determined area in the image frame acquired after the second image frame.

In one embodiment, the obtaining module 901 is further configured to play the obtained image frames frame by frame according to an acquisition time sequence when the action of triggering adding the additional element is not detected. The adding module 904 is further configured to play the image frames to which the additional element is added frame by frame according to the acquisition time sequence after the action of triggering adding the additional element is detected.

In one embodiment, the adding module 904 is further configured to replace corresponding image frames before the additional element is added with the image frames to which the additional element is added, and generate, according to a time sequence of acquisition times of image frames determined after the replacement, a recorded video by using the image frames determined after the replacement, wherein the image frames determined after the replacement, an acquisition time of the image frame to which the additional element is added is an acquisition time of the corresponding image frame before the additional element is added.

Figure 10:
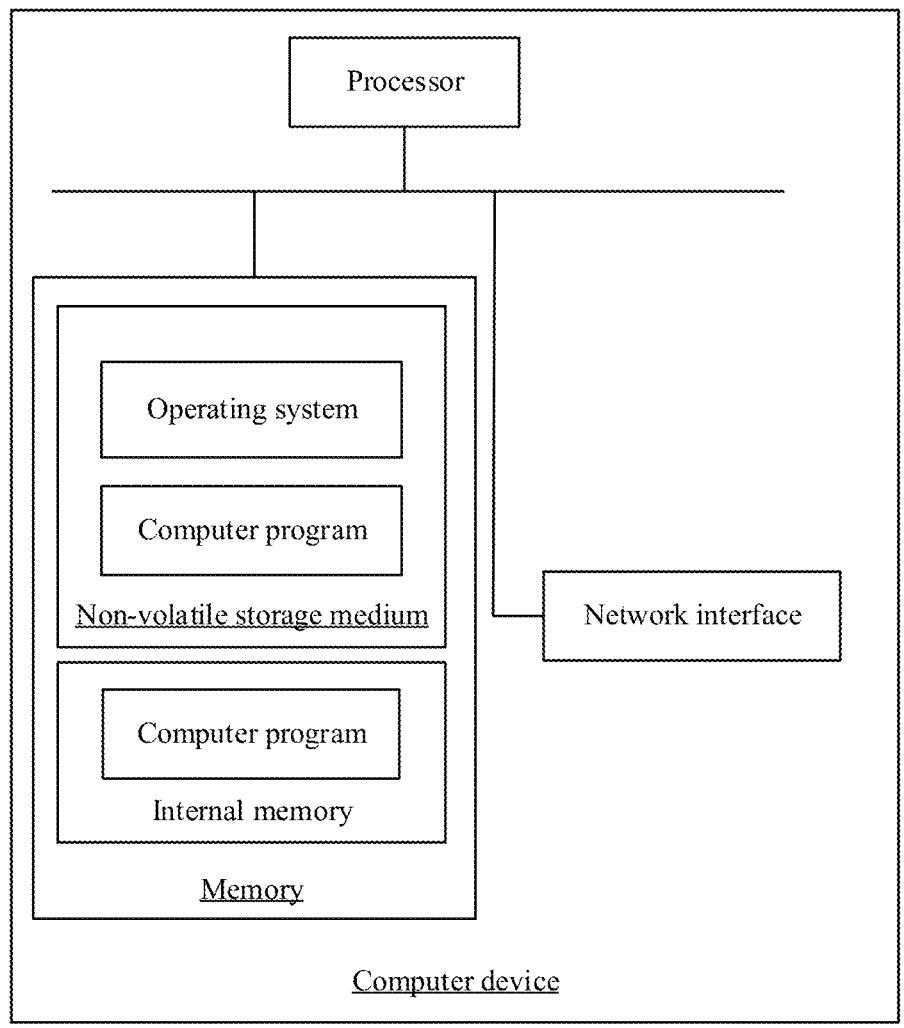
FIG. 10 is a diagram of an internal structure of a computer device according to an embodiment.

FIG. 10 is a diagram of an internal structure of a computer device according to an embodiment. The computer device may be specifically the terminal 110 or the server 120 in FIG. 1. As shown in FIG. 10, the computer device includes a processor, a memory, and a network interface that are connected through a system bus. The memory includes a non-volatile storage medium and an internal memory. The non-volatile storage medium of the computer device stores an operating system and may further store a computer program, the computer program, when executed by the processor, may cause the processor to implement the image processing method. The internal memory may also store a computer program, the computer program, when executed by the processor, may cause the processor to perform the image processing method. A person skilled in the art may understand that, the structure shown in FIG. 10 is only a block diagram of a partial structure related to the solution in this application, and does not limit the computer device to which the solution of this application is applied. Specifically, the computer device may include more components or fewer components than those shown in the figure, or some components may be combined, or a different component deployment may be used.

In one embodiment, the image processing apparatus provided in this application may be implemented in a form of a computer program. The computer program may be run on the computer device shown in FIG. 10, and the non-volatile storage medium of the computer device may store program modules constituting the image processing apparatus, for example, the obtaining module 901, the determining module 902, the detecting module 903, and the adding module 904 shown in FIG. 9. The computer program constituted by the program modules cause the processor to perform the steps in the image processing method in the embodiments of this application described in this specification.

For example, the computer device shown in FIG. 10 may obtain acquired image frames by using the obtaining module 901 in the image processing apparatus 900 shown in FIG. 9. A target area and a reference area that are obtained through image semantic segmentation are determined in the acquired image frames by using the determining module 902. When a location relationship between the target area and the reference area in an obtained first image frame meets an action start condition and a location relationship between the target area and the reference area in an obtained second image frame meets an action end condition, that an action of triggering adding an additional element is detected is determined by using the detecting module 903, the second image frame being acquired after the first image frame. The additional element is obtained when the action is detected, and the additional element is added to image frames acquired after the second image frame by using the adding module 904.

In one embodiment, a computer-readable storage medium is provided, the computer-readable storage medium storing a computer program, and the computer program, when executed by the processor, causing the processor to perform the following steps: obtaining acquired image frames, determining, in each obtained image frame, a target area and a reference area that are obtained through image semantic segmentation, determining, when a location relationship between the target area and the reference area in an obtained first image frame meets an action start condition and a location relationship between the target area and the reference area in an obtained second image frame meets an action end condition, that an action of triggering adding an additional element is detected, the second image frame being acquired after the first image frame, obtaining the additional element when the action is detected, and adding the additional element to image frames acquired after the second image frame.

In one embodiment, the determining, in each obtained image frame, a target area and a reference area that are obtained through image semantic segmentation includes: inputting the obtained image frame to an image semantic segmentation model, outputting a target area probability distribution matrix and a reference area probability distribution matrix through the image semantic segmentation model, determining the target area in the obtained image frame according to the target area probability distribution matrix, and determining the reference area in the obtained image frame according to the reference area probability distribution matrix.

In one embodiment, the target area is a hand area, and the reference area is a face area. The computer program further causes the processor to perform the following step: determining a gesture type corresponding to the hand area in the obtained image frame.

The computer program further causes the processor to perform the following step: determining, when a gesture type of the first image frame is a trigger type, a location relationship between the hand area and the face area in the first image frame meets the action start condition, and a location relationship between the hand area and the face area in the second image frame meets the action end condition, that the action of triggering adding the additional element is detected.

In one embodiment, the computer program further causes the processor to perform the following steps: starting timing when the location relationship between the target area and the reference area in the first image frame meets the action start condition, and determining, when a time duration does not reach a preset duration and the location relationship between the target area and the reference area in the second image frame obtained after the first image frame meets the action end condition, that the action of triggering adding the additional element is detected.

In one embodiment, the computer program further causes the processor to perform the following step: determining, when a proportion of an intersection of the target area and the reference area in the first image frame to the target area exceeds a first preset value, that the location relationship between the target area and the reference area in the first image frame meets the action start condition, or determining, when a proportion of an intersection of the target area and the reference area in the first image frame to the target area exceeds a second preset value and a center location of the target area is located above a center location of the reference area, that the location relationship between the target area and the reference area in the first image frame meets the action start condition.

In one embodiment, the computer program further causes the processor to perform the following steps: determining a reference location in the reference area in the second image frame, and determining, when the target area in the second image frame is located above the reference location in the reference area, that the location relationship between the target area and the reference area in the second image frame meets the action end condition.

In one embodiment, the target area is a hand area, the reference area is a face area, and the reference location is locations of eyebrows. The adding the additional element to image frames acquired after the second image frame includes: determining, in each image frame acquired after the second image frame, an area formed by the locations of the eyebrows in the face area and a boundary of the hand area close to the locations of the eyebrows, and adaptively adding the additional element to the determined area in the image frame acquired after the second image frame.

In one embodiment, the computer program further causes the processor to perform the following steps: playing the obtained image frames frame by frame according to an acquisition time sequence when the action of triggering adding the additional element is not detected, and playing the image frames to which the additional element is added frame by frame according to the acquisition time sequence after the action of triggering adding the additional element is detected.

In one embodiment, the computer program further causes the processor to perform the following steps: replacing corresponding image frames before the additional element is added with the image frames to which the additional element is added, and generating, according to a time sequence of acquisition times of image frames determined after the replacement, a recorded video by using the image frames determined after the replacement, where in the image frames determined after the replacement, an acquisition time of the image frame to which the additional element is added is an acquisition time of the corresponding image frame before the additional element is added.

In one embodiment, a computer device is provided, including a memory and a processor, the memory storing a computer program, and the computer program, when executed by the processor, causing the processor to perform the following steps: obtaining acquired image frames; determining, in each obtained image frame, a target area and a reference area that are obtained through image semantic segmentation; determining, when a location relationship between the target area and the reference area in an obtained first image frame meets an action start condition and a location relationship between the target area and the reference area in an obtained second image frame meets an action end condition, that an action of triggering adding an additional element is detected, the second image frame being acquired after the first image frame; obtaining the additional element when the action is detected; and adding the additional element to image frames acquired after the second image frame.

In one embodiment, the computer program, when executed by the processor to perform the step of determining, in each obtained image frame, a target area and a reference area that are obtained through image semantic segmentation, causes the processor to perform the following steps: inputting the obtained image frame to an image semantic segmentation model; outputting a target area probability distribution matrix and a reference area probability distribution matrix through the image semantic segmentation model; determining the target area in the obtained image frame according to the target area probability distribution matrix; and determining the reference area in the obtained image frame according to the reference area probability distribution matrix.

In one embodiment, the target area is a hand area, the reference area is a face area, and the computer program, when executed by the processor, causes the processor to perform the following steps: determining a gesture type corresponding to the hand area in the obtained image frame.

The computer program, when executed by the processor to perform the step of determining, when a location relationship between the target area and the reference area in an obtained first image frame meets an action start condition and a location relationship between the target area and the reference area in an obtained second image frame meets an action end condition, that an action of triggering adding an additional element is detected, causes the processor to perform the following step: determining, when a gesture type of the first image frame is a trigger type, a location relationship between the hand area and the face area in the first image frame meets the action start condition, and a location relationship between the hand area and the face area in the second image frame meets the action end condition, that the action of triggering adding the additional element is detected.

In one embodiment, the computer program, when executed by the processor to perform the step of determining, when a location relationship between the target area and the reference area in an obtained first image frame meets an action start condition and a location relationship between the target area and the reference area in an obtained second image frame meets an action end condition, that an action of triggering adding an additional element is detected, causes the processor to perform the following steps: starting timing when the location relationship between the target area and the reference area in the first image frame meets the action start condition; and determining, when a time duration does not reach a preset duration and the location relationship between the target area and the reference area in the second image frame obtained after the first image frame meets the action end condition, that the action of triggering adding the additional element is detected.

In one embodiment, the computer program, when executed by the processor, causes the processor to perform the following step: determining, when a proportion of an intersection of the target area and the reference area in the first image frame to the target area exceeds a first preset value, that the location relationship between the target area and the reference area in the first image frame meets the action start condition; or determining, when a proportion of an intersection of the target area and the reference area in the first image frame to the target area exceeds a second preset value and a center location of the target area is located above a center location of the reference area, that the location relationship between the target area and the reference area in the first image frame meets the action start condition.

In one embodiment, the computer program, when executed by the processor, causes the processor to perform the following steps: determining a reference location in the reference area in the second image frame; and determining, when the target area in the second image frame is located above the reference location in the reference area, that the location relationship between the target area and the reference area in the second image frame meets the action end condition.

In one embodiment, the target area is a hand area, the reference area is a face area, the reference location is locations of eyebrows, and the computer program, when executed by the processor to perform the step of adding the additional element to image frames acquired after the second image frame, causes the processor to perform the following steps: determining, in each image frame acquired after the second image frame, an area formed by the locations of the eyebrows in the face area and a boundary of the hand area close to the locations of the eyebrows; and adding the additional element to the determined area in the image frame acquired after the second image frame.

In one embodiment, the computer program, when executed by the processor, causes the processor to perform the following steps: playing the obtained image frames frame by frame according to an acquisition time sequence when the action of triggering adding the additional element is not detected; and playing the image frames to which the additional element is added frame by frame according to the acquisition time sequence after the action of triggering adding the additional element is detected.

In one embodiment, the computer program, when executed by the processor, causes the processor to perform the following steps: replacing corresponding image frames before the additional element is added with the image frames to which the additional element is added; and generating, according to a time sequence of acquisition times of image frames determined after the replacement, a recorded video by using the image frames determined after the replacement, where in the image frames determined after the replacement, an acquisition time of the image frame to which the additional element is added is an acquisition time of the corresponding image frame before the additional element is added.

A person of ordinary skill in the art may understand that all or some of the processes in the method of the foregoing embodiments may be implemented and completed by using the computer programs to instruct related hardware. The programs may be stored in a non-volatile computer-readable storage medium, and the programs, when executed, may include the processes of the foregoing method embodiments. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only show several implementations of this application and are described in detail, but they are not to be construed as a limit to the patent scope of this application. A person of ordinary skill in the art may further make variations and improvements without departing from the ideas of this application, which all fall within the protection scope of this application. Therefore, the protection scope of this application is to be subject to the protection scope of the appended claims.

What is claimed is:

1. An image processing method, applied in an image processing system, the method comprising:
   acquiring a first image frame and a second image frame;

identifying a first target area and a first reference area in the first image frame, and identifying a second target area and a second reference area in the second image frame;

detecting, when a location relationship between the first target area and the first reference area in the first image frame meets an action start condition and a location relationship between the second target area and the second reference area in the second image frame meets an action end condition, an action to trigger adding an additional element, the second image frame being acquired after the first image frame, wherein the location relationship is determined to meet the action start condition, in response to determining a proportion of an intersection of the first target area and the first reference area in the first image frame to the first target area exceeds a first preset value, or in response to determining a proportion of an intersection of the first target area and the first reference area in the first image frame to the first target area exceeds a second preset value and a center location of the first target area is located above a center location of the first reference area;

obtaining the additional element when the triggering action is detected; and adding the additional element to a third image frame acquired after the second image frame.

2. The method according to claim 1, wherein identifying the first target area and the first reference area in the first image frame comprises:

inputting the first image frame to an image semantic segmentation model;

outputting a target area probability distribution matrix and a reference area probability distribution matrix through the image semantic segmentation model;

identifying the first target area in the first image frame according to the target area probability distribution matrix; and identifying the first reference area in the first image frame according to the reference area probability distribution matrix.

3. The method according to claim 1, wherein the first target area is a hand area, the first reference area is a face area, and the method further comprises:

determining a gesture type corresponding to the first hand area in the first image frame; and wherein detecting the action to trigger adding the additional element comprises:

when the gesture type of the first image frame is a trigger type, detecting the action to trigger adding the additional element.

4. The method according to claim 1, wherein detecting the action to trigger adding the additional element comprises:

starting timing when the location relationship between the first target area and the first reference area in the first image frame meets the action start condition to obtain a time duration between an acquisition time of the first image and an acquisition time of the second image; and determining, when the time duration does not reach a preset duration and the location relationship between the second target area and the second reference area in the second image frame meets the action end condition, that the action of triggering adding the additional element is detected.

5. The method according to claim 1, wherein the method further comprises:

determining a reference location in the second reference area in the second image frame; and determining, when the second target area in the second image frame is located above the reference location in the second reference area, that the location relationship between the second target area and the second reference area in the second image frame meets the action end condition.

6. The method according to claim 1, wherein the second target area is a hand area, the second reference area is a face area, the second reference area includes locations of eyebrows, and adding the additional element to image frames acquired after the second image frame comprises:

determining, in the third image frame acquired after the second image frame, an area formed by the locations of the eyebrows in the face area and a boundary of the hand area; and adding the additional element to the determined area in the third image frame acquired after the second image frame.

7. The method according to claim 1, wherein a time duration exists between an acquisition time of the first image frame and an acquisition time of the second image frame, and the method further comprises:

adding a first color to the additional element in response to determining the time duration is of a first value; and adding a second color different than the first color to the additional element in response to determining the time duration is of a second value different than the first value.

8. The method according to claim 1, wherein the first image frame is image frame A, the second image frame is image frame B, the third image frame is image frame C, an image frame C1 forms after the additional element is added to the image frame C, and the method further comprises:

acquiring image frame D after the image frame C, adding the additional element to the image frame D to obtain image frame D1; and playing in this order the image frame A, the image frame B, the image frame C1, and the image frame D1.

9. The method according to claim 1, further comprising:
replacing the image frame C with image frame C1;
replacing the image frame D with the image frame D1; and generating a video including the image frame A, the image frame B, the image frame C1, and the image frame D1, the video excluding the image frame C and the image frame D.

10. An image processing apparatus, comprising: a memory storing computer program instructions; and a processor coupled to the memory and configured to execute the computer program instructions and perform:

acquiring a first image frame and a second image frame;

identifying a first target area and a first reference area in the first image frame, and identifying a second target area and a second reference area in the second image frame;

detecting when a location relationship between the first target area and the first reference area in the first image frame meets an action start condition and a location relationship between the second target area and the second reference area in the second image frame meets an action end condition, an action to trigger adding an additional element, the second image frame being acquired after the first image frame, wherein the location relationship is determined to meet the action start condition, in response to determining a proportion of an intersection of the first target area and the first reference area in the first image frame to the first target area exceeds a first preset value, or in response to determining a proportion of an intersection of the first target area and the first reference area in the first image frame to the first target area exceeds a second preset value and a center location of the first target area is located above a center location of the first reference area;

obtaining the additional element when the triggering action is detected and adding the additional element to a third image frame acquired after the second image frame.

11. The apparatus according to claim 10, wherein identifying the first target area and the first reference area in the first image frame includes:

inputting the first image frame to an image semantic segmentation model;

outputting a target area probability distribution matrix and a reference area probability distribution matrix through the image semantic segmentation model;

identifying the first target area in the first image frame according to the target area probability distribution matrix; and identifying the first reference area in the first image frame according to the reference area probability distribution matrix.

12. The apparatus according to claim 10, wherein detecting the action to trigger adding the additional element includes:

starting timing when the location relationship between the first target area and the first reference area in the first image frame meets the action start condition to obtain a time duration between an acquisition time of the first image and an acquisition time of the second image; and determining, when the time duration does not reach a preset duration and the location relationship between the second target area and the second reference area in the second image frame meets the action end condition, that the action of triggering adding the additional element is detected.

13. A non-transitory computer-readable storage medium, the computer-readable storage medium storing a computer program, and the computer program, when executed by a processor, causing the processor to perform the operations of an image processing method, the method including:

acquiring a first image frame and a second image frame;

identifying a first target area and a first reference area in the first image frame, and identifying a second target area and a second reference area in the second image frame;

detecting, when a location relationship between the first target area and the first reference area in the first image frame meets an action start condition and a location relationship between the second target area and the second reference area in the second image frame meets an action end condition, an action to trigger adding an additional element, the second image frame being acquired after the first image frame, wherein the location relationship is determined to meet the action start condition, in response to determining a proportion of an intersection of the first target area and the first reference area in the first image frame to the first target area exceeds a first preset value, or in response to determining a proportion of an intersection of the first target area and the first reference area in the first image frame to the first target area exceeds a second preset value and a center location of the first target area is located above a center location of the first reference area;

obtaining the additional element when the triggering action is detected; and adding the additional element to a third image frame acquired after the second image frame.

14. The non-transitory computer-readable storage medium according to claim 13, wherein identifying the first target area and the first reference area in the first image frame includes:

inputting the first image frame to an image semantic segmentation model;

outputting a target area probability distribution matrix and a reference area probability distribution matrix through the image semantic segmentation model;

identifying the first target area in the first image frame according to the target area probability distribution matrix; and identifying the first reference area in the first image frame according to the reference area probability distribution matrix.

15. The non-transitory computer-readable storage medium according to claim 13, wherein the first target area is a hand area, the first reference area is a face area, and the method further includes:

determining a gesture type corresponding to the first hand area in the first image frame; and wherein detecting the action to trigger adding the additional element includes:

when the gesture type of the first image frame is a trigger type detecting the action to trigger adding the additional element.

16. The non-transitory computer-readable storage medium according to claim 13, wherein detecting the action to trigger adding the additional element includes:

starting timing when the location relationship between the first target area and the first reference area in the first image frame meets the action start condition to obtain a time duration between an acquisition time of the first image and an acquisition time of the second image; and determining, when the time duration does not reach a preset duration and the location relationship between the second target area and the second reference area in the second image frame meets the action end condition, that the action of triggering adding the additional element is detected.

17. The non-transitory computer-readable storage medium according to claim 13, wherein the method further includes:

determining a reference location in the second reference area in the second image frame; and determining, when the second target area in the second image frame is located above the reference location in the second reference area, that the location relationship between the second target area and the second reference area in the second image frame meets the action end condition.

18. The non-transitory computer-readable storage medium according to claim 13, wherein the second target area is a hand area, the second reference area is a face area, the second reference area includes locations of eyebrows, and adding the additional element to image frames acquired after the second image frame comprises:

determining, in the third image frame acquired after the second image frame, an area formed by the locations of the eyebrows in the face area and a boundary of the hand area; and adding the additional element to the determined area in the third image frame acquired after the second image frame.

\* \* \* \* \*